United States Patent [19]

Lever

[11] 4,204,497
[45] May 27, 1980

[54] ELECTROSTATIC COATING APPARATUS HAVING CONVEYOR BELT, FLUIDIZING AND ELECTROSTATIC MEANS FOR RECIRCULATION OF COATING PARTICLES

[75] Inventor: Robert C. Lever, London, England

[73] Assignee: Volstatic Holding Limited, United Kingdom

[21] Appl. No.: 939,368

[22] Filed: Sep. 5, 1978

[30] Foreign Application Priority Data

Sep. 14, 1977 [GB] United Kingdom .............. 38356/77

[51] Int. Cl.² ............................................ B05B 5/02
[52] U.S. Cl. .................................. 118/634; 118/625; 118/629
[58] Field of Search ............... 118/634, 625, 627, 629, 118/602

[56] References Cited
U.S. PATENT DOCUMENTS

| | | | |
|---|---|---|---|
| 2,730,460 | 1/1956 | Ransburg ......................... | 118/634 X |
| 3,439,649 | 4/1969 | Probst et al. .................... | 118/634 X |
| 3,453,134 | 7/1969 | Haw ................................. | 118/634 X |
| 3,902,455 | 2/1975 | Lehmann ......................... | 118/312 X |

FOREIGN PATENT DOCUMENTS 1530508  11/1978  United Kingdom .

*Primary Examiner*—John D. Welsh
*Attorney, Agent, or Firm*—Foster York

[57] ABSTRACT

The invention relates to an improvement in an electrostatic coating apparatus comprising a booth, air flow means, conveyor means and a powder spray gun, wherein the improvement comprises an endless conveyor belt and gaseous projection means for redirecting particles of coating material falling toward the floor to the articles to be coated and electrostatic means for recharging the particles.

8 Claims, 2 Drawing Figures

ELECTROSTATIC COATING APPARATUS HAVING CONVEYOR BELT, FLUIDIZING AND
ELECTROSTATIC MEANS FOR RECIRCULATION
OF COATING PARTICLES

TECHNICAL FIELD

The invention relates to an installation for electrostatically depositing solid particles of dielectric coating material on an article in which the deposition efficiency is increased over the deposition efficiency of installations hitherto available.

BACKGROUND ART

Dielectric coating materials electrostatically deposited on articles comprise liquid droplets of paint formed from pigment, resinous binder and solvent or, simply, dry powder particles of pigment and resinous material. In each case, one of the major drawbacks of electrostatic deposition arises from the fact that not all of the particles which are directed towards an article to be coated are sufficiently electrostatically charged to be attracted to the article. These particles, and other charged particles which overshoot the article to be coated eventually settle on the floor of the installation. The resultant loss in deposition efficiency means that the effort expended in dispensing the particles which eventually finish on the floor of the installation is wasted. Moreover, where the particles represent droplets of liquid paint, deposition on the floor of the installation normally means that this expensive raw material is completely lost. Even where dry coating powders are used instead of paints, the powders deposited on the floor of the installation can only be re-used after expensive recovery operations.

Similar losses also occur when coating material particles are deposited on the side walls of the installation. However, this creates even more serious problems where the coating material consists of dry powder particles because, whenever it becomes necessary to change the colour of the coating material being dispensed, there is a possibility that coating material of a different colour which has already been deposited on the walls of the installation will be dislodged and transmitted into contact with the article to be coated, thereby causing the article to be at least partly coated with material of the wrong colour.

DISCLOSURE OF THE INVENTION

It is an object of the present invention to provide an installation in which articles can be electrostatically coated with solid particles of dielectric coating material so that the deposition efficiency is higher than hitherto attainable and with less difficulty than hitherto experienced when dispensing a coating of solid particulate material of one colour after dispensing a coating of solid particulate material of another colour.

According to the invention, there is provided an installation, for electrostatically depositing solid particles of dielectric coating material on an article, comprising a booth providing a roof portion, a floor portion and two opposite side wall portions respectively extending between opposite sides of the roof portion and opposite sides of the floor portion to define a passageway having open inlet and outlet ends; air flow inducing means for inducing an inwardly flow of air along the passageway from the inlet and outlet ends of the passageway to a pressure sink disposed between said inlet and outlet ends; means for transporting articles to be coated along a path through the passageway, from the inlet end to the outlet end; a powder spray gun disposed between said outlet end and said pressure sink and provided with dispensing means for directing a cloud of particles of coating material into the path of the articles through the passageway, and first electrostatic means for ensuring that the majority of coating particles issued by the dispensing means and the articles to be coated have different electrostatic potentials, to promote the deposition of the particles on the articles; fluidising means for redirecting particles of coating material which fall towards the floor portion of the installation back into the path of the articles through the passageway; and second electrostatic means for charging particles which are recirculated by the fluidising means so that they have a different electrostatic potential to the articles.

In an installation such as this, the first electrostatic means may be provided by a conventional electrostatic spray gun for particulate solid coating material. In this case, it is convenient to hold the articles to be coated at earth potential simply by earthing a rail forming a conveyor track extending through the booth for the carriage of articles to be coated and to provide the particles of coating material which are discharged by the dispensing means with a negative charge in the range 15kv to 150kv. However, experience has shown that up to at least 20% of the particles discharged by the dispensing means may have a negligible electrostatic charge and so, it is for this reason that the second electrostatic means are provided. These second electrostatic means may comprise a plurality of discharge electrodes spaced between the open ends of the passageway and shaped for concentrating an electric field between the electrodes and the articles to be coated. In an alternative form of the second electrostatic means, which can also be used in addition to the specially shaped electrodes, the second electrostatic means may comprise at least one wire suspended from a side wall portion of the booth.

Although both the first and second electrostatic means may be connected to electrostatic generator means, it has been found that perfectly satisfactory results are obtained when only the second electrostatic means are connected to electrostatic generator means. In this case, provided the first electrostatic means provided on each spray gun include a pointed electrode, the electrostatic field set up between the first and second electrostatic means is sufficient to ensure adequate operation of the first electrostatic means.

In a preferred embodiment of the invention, the fluidising means may comprise an endless conveyor belt of dielectric material is mounted between the opposite side wall portions of the booth with an upper reach extending throughout the length of the passageway so as to provide the floor portion of the booth, and means are provided for driving the endless conveyor belt so that the upper reach moves from the open inlet end of the passageway to the open outlet end. In this case, the fluidising means may also comprise at least one nozzle disposed at or adjacent the outlet end of the passageway, and means for directing a stream of gaseous medium through each said nozzle onto an outlet end portion of the upper reach of the endless conveyor belt in a direction having a component extending towards said inlet end of the passageway from said outlet end. Coating material suitable for use in such an installation commonly comprises epoxy, polyester or nylon resin having a specific resistance of the order of $10^{31}$ to $10^{15}$ ohms/meter.

Preferably, the fluidising means include at least one pair of nozzles, the nozzles of each pair being respectively mounted in the two opposite side wall portions of the booth.

The efficiency of the fluidising means cooperating with the endless conveyor belt may be improved if the outlet end portion of the upper reach of the endless conveyor belt extends downwardly from within the passageway to said outlet end of the passageway so that the particles of dielectric coating material which are entrained in gaseous medium from the or each nozzle are directed upwardly into the path of articles passing through the passageway. This upward inclination of the outlet end portion of the upper reach of the endless conveyor belt may be provided as part of a substantially planar upper reach extending between end rollers disposed at different levels. However, the upper reach of the endless conveyor belt is preferably non-planar, being supported between two end rollers by an intermediate roller which is at a higher level than the end roller at said outlet end of the passageway.

The operation of the fluidising means may also be improved by the provision of a deflector which extends across the outlet end portion of the upper reach of the endless conveyor belt so as to assist in directing entrained particles of dielectric coating material upwardly into the path of articles to be coated. This deflector may be adjustable so as to vary the direction in which the entrained particles are directed. The deflector may also be provided with scraper means for dislodging particles which have settled on the upper reach of the endless conveyor belt.

For flexibility of operation, both the speed of the endless conveyor belt and the rate of flow of gaseous medium through the nozzles may be varied so as to ensure that particles of coating material which settle on the floor portion of the booth are fluidised in such a way that they are directed into the path of articles to be coated which are transported through the booth from said inlet end of the passageway to the outlet end. In order to minimise deposition of coating material on the roof and side wall portions of the booth, these portions of the booth may be lined with insulating material such as nylon, polyethylene, polyvinyl chloride or polytetrafluoroethylene. Material such as this acquires an induced electric charge of the same sign as the first and second electrostatic means and this induced charge therefore inhibits the deposition of charged coating material particles. This clearly improves the chances of particles being deposited upon the articles to be coated and thereby increases the deposition efficiency. Moreover, the reduction in deposition of the solid particles on the roof and side wall portions of the booth improve the suitability of the installation for dispensing coating materials of different colours. This improvement arises because there are very few particles of coating material of one colour to be dislodged from the roof and side wall portions of the booth by particles of coating material of another colour which are subsequently being discharged from the dispensing means.

BRIEF DESCRIPTION OF THE DRAWINGS

An embodiment of the invention is hereinafter described, by way of example, with reference to the accompanying drawings, in which.

BEST MODE FOR CARRYING OUT THE INVENTION

Figure 1:
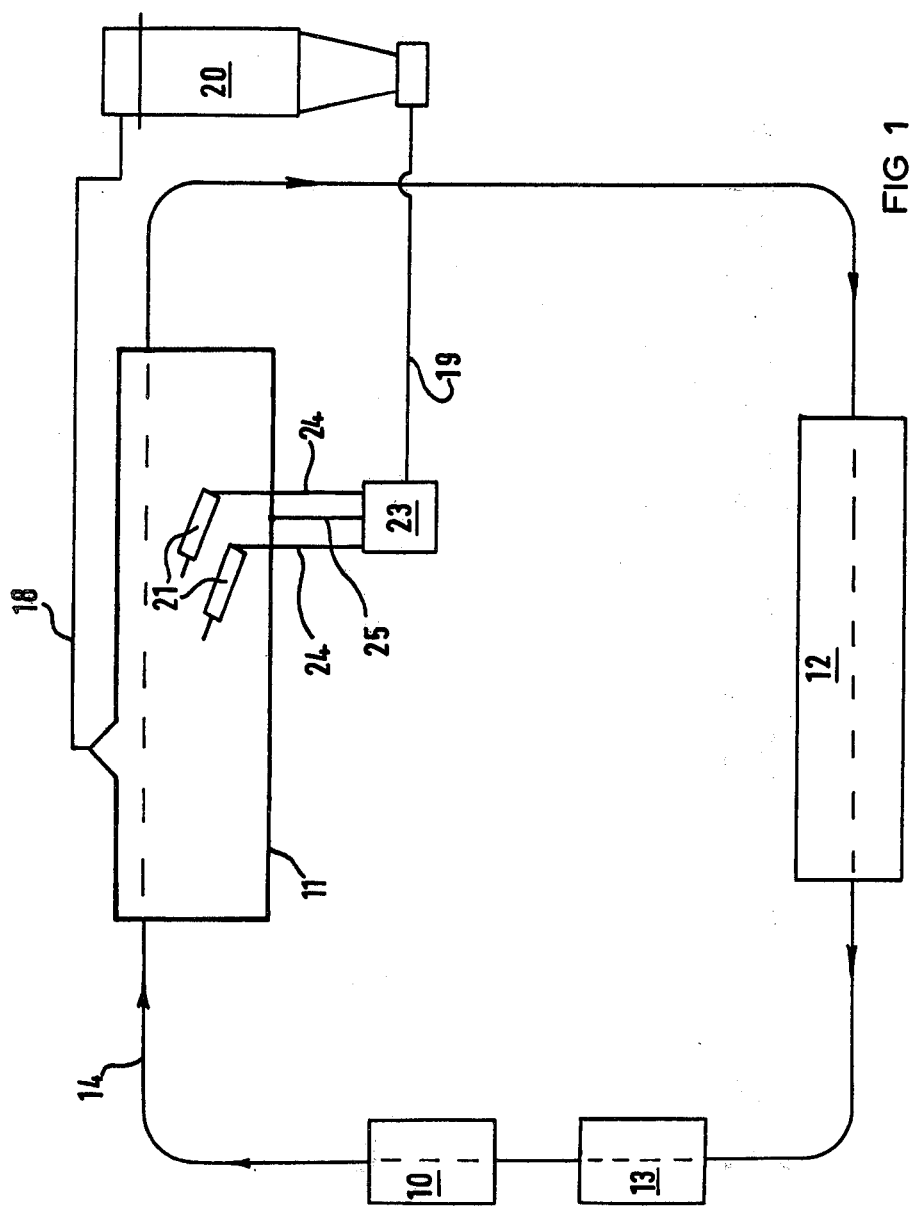
FIG. 1 is a plan view of a plant for coating articles and including an installation for the electrostatic deposition of particles of solid dielectric coating material.

As shown in FIG. 1, the plant comprises a loading station 10, a powder spraying booth 11 and ancillary equipment (shown in greater detail in FIG. 2), a tunnel oven 12 and an unloading station 13 which are arranged around a rail 14 providing an endless conveyor track for articles 15 (FIG. 2) to be coated.

In operation, articles 15 are suspended from trolleys 16 mounted on the rail 14 as these trolleys 16 pass through the loading station 10. The trolleys 16 are joined together by links 16A so as to form an endless loop and drive means (not shown) are provided for moving the trolleys 16 around the conveyor track. The articles 15 are therefore carried through a passageway provided by the booth 11, in through an open inlet end 11A and out of an open outlet end 11B, and are then carried through the tunnel oven 12 which operates at a temperature sufficiently high, for example 180° to 250° C., to cure the resinous component of the powdered coating material dispensed from two spray guns 21 and deposited on the articles as they move through the passageway provided by the booth 11. The articles 15 are then removed from the trolleys 16 at the unloading station 13.

Figure 2:
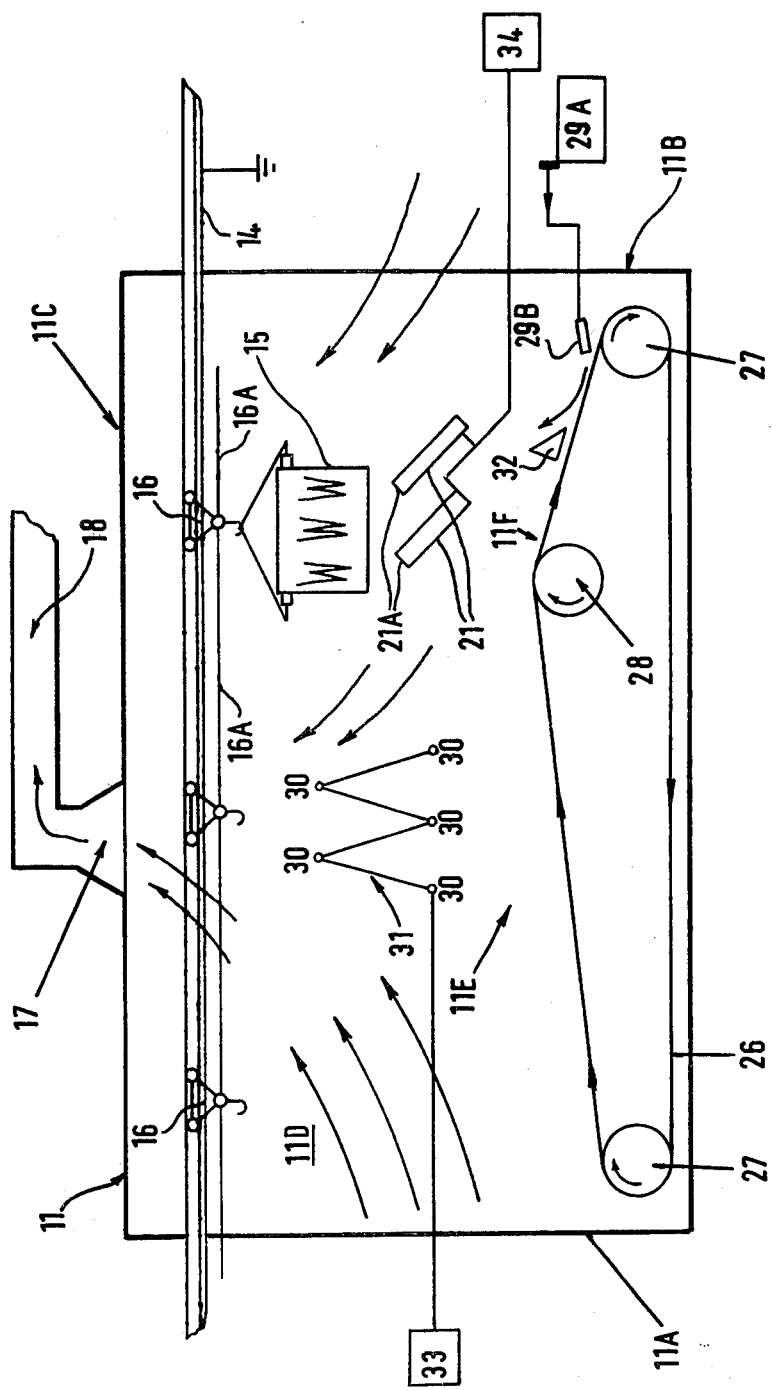
FIG. 2 is a sectional side elevation of the installation forming part of the plant shown in FIG. 1.

As shown schematically in FIG. 2, the conveyor track rail 14 is earthed so that the articles are maintained at earth potential. The spray guns 21 are each provided with first electrostatic means 21A, in the form of discharge electrodes for ensuring that the particles of coating material dispensed from these guns are charged to a negative electrostatic potential of between 15kv and 150kv so that the particles are electrostatically attracted to the articles 15. For this purpose, as shown schematically in FIG. 2, the electrostatic means 21A are connected to first electrostatic generator means 34.

In order to ensure that coating material does not issue freely from the booth 11, the booth 11 is provided with a vent 17 which is connected to a cyclone separator 20 by means of ducting 18. The cyclone separator 20 is operated so as to withdraw air from the booth 11 so that air flowing into the booth from the open inlet and outlet ends 11A and 11B of the passageway prevent the unwanted egress of coating material from these open ends. As shown more clearly in FIG. 2, the vent 17 provides a pressure sink which is disposed between the open inlet and outlet ends 11A and 11B of the passageway, but is disposed nearer the inlet end 11A than the outlet end 11B so that although an inward flow of air is induced along the passageway from each open end 11A and 11B, the longer of these flow paths (from the outlet end 11B) extends in the opposite direction to the path of the articles 15 to be coated and the spray guns 21 are disposed adjacent the open end 11B so that the cloud of particles discharged from these guns is carried along by the air flow in the opposite direction to the direction of movement of the articles 15. As hereinafter explained, this improves the chances that the particles will be deposited on the articles 15.

Powdered coating material extracted in the cyclone separator 20 from air withdrawn from the booth 11 can be transported to a fluidiser 23 by means of a conveyor 19 and fed from the fluidiser 23 to the spray guns 21 by means of feed lines 24. Excessive pressure build-up in the fluidiser 23 during operation is vented through a line 25 which is connected to any convenient part of the booth 11 where spray powder, becoming airborne in the fluidiser 23 and vented through the line 25, will become electrostatically charged so as to be capable of electrostatic deposition on an article 15.

As shown in FIG. 2, the booth 11 has a roof portion 11C, two side wall portions 11D (only one of which is shown) and a floor portion provided by the upper reach 11E of an endless belt 26 of P.V.C. which is trained around two end rollers 27 at the same level and an intermediate roller 28 at a higher level so that the outlet end portion 11F of the upper reach 11E of the endless conveyor belt 26 adjacent said outlet end 11B of the passageway through the booth 11 extends downwardly from within the passageway to said outlet end 11B.

In operation of the installation shown in FIG. 2, the endless belt 26 is driven in a clockwise direction and air from a compressor 29A is blown upwardly along the outlet end portion 11F of the upper reach 11E of the conveyor belt 26 through two nozzles 29B (only one of which is shown) respectively mounted in the side wall portions 11D of the booth 11 so as to entrain coating material particles deposited on the upper reach 11E of the conveyor belt 26 and to fluidise these particles in a stream which is directed into the path of articles 15 as they are moved through the passageway provided by the booth 11. In order to assist in the fluidising effect of this art stream, and to direct the particles into the upper part of the booth 11, a triangular section deflector 32 extends across the outlet end portion 11F of the upper reach 11E of the endless conveyor belt 23.

Second electrostatic means, for charging the fluidised particles blown from the conveyor belt 26, are connected to second electrostatic generator means 33 and provided in the form of pointed or serrated edge electrodes 30, which are mounted in the side wall portions 11D of the booth 11, and a continuous wire 31 interconnecting these electrodes 30. These second electrostatic means , like the first electrostatic means 21A provided by the guns 21 which are connected to the first electrostatic generator means 34, provide a negative potential of between 15kv to 150kv. The earthed articles 15 are therefore maintained at a substantially different potential from the charged particles issuing from the spray guns 21 and the particles charged by the second electrostatic means 30 and 31.

To prevent deposition of coating material particles on the roof and side wall portions 11C and 11D, these portions of the booth 11 are coated with polyethylene.

By arranging the installation so that the articles 15 to be coated move in the opposite direction to the direction of drift of particles from said outlet end 11B to the pressure sink provided by the vent 17, the fluidised particles which have been recharged by the second electrostatic means 30 and 31 are directed into contact with the articles 15 before large numbers of similarly charged particles have been deposited on these articles 15 and so, in the absence of any repulsive effect of already deposited particles, deposition of these recharged particles is enhanced.

I claim:

1. In an installation, for electrostatically depositing solid particles of dielectric coating material on an article, in which:

a booth provides a roof portion, a floor portion and two opposite side wall portions respectively extending between opposite sides of the roof portion and opposite sides of the floor portion to define a passageway having open inlet and outlet ends;

air flow inducing means are provided for inducing an inward flow of air along the passageway from the inlet and outlet ends of the passageway to a pressure sink disposed between said inlet and outlet ends;

conveyor means are provided for transporting articles to be coated along a path through the passageway, from the inlet end to the outlet end;

a powder spray gun, disposed between said outlet end and said pressure sink is provided with dispensing means for directing a cloud of particles of coating material into the path of the articles passing through the passageway, and first electrostatic means for ensuring that the majority of coating particles issuing from the powder spray gun and the articles have different electrostatic potentials, to promote the deposition of the particles on the articles;

the improvement comprising:

an endless conveyor belt of dielectric material which is mounted between the opposite side wall portions of the booth, has an upper reach, with an outlet end portion, extending throughout the length of the passageway so as to provide the floor portion of the booth, and is drivable so that the upper reach moves from said inlet end of the passageway to said outlet end;

at least one nozzle disposed at or adjacent said outlet end of the passageway and means for directing a stream of gaseous medium through each said nozzle onto the outlet end portion of the upper reach, in a direction having a component extending towards said inlet end of the passageway from said outlet end so as to cooperate with the endless conveyor belt to form fluidising means for redirecting particles of coating material which fall towards the floor portion of the booth back into the path of the articles passing through the passageway; and second electrostatic means for charging particles which are re-circulated by the fluidising means so that these particles have a different electrostatic potential to the articles.

2. An installation, according to claim 1, in which the outlet end portion of the upper reach extends downwardly from within the passageway to said outlet end of the passageway so that particles of dielectric coating material which are entrained in the gaseous medium from the or each nozzle are directed upwardly into the path of articles passing through the passageway.

3. An installation, according to claim 1 or claim 2, in which a deflector extends across the outlet end portion of the upper reach of the endless conveyor belt.

4. An installation, according to claim 1 or claim 2, in which the second electrostatic means comprise at least one discharge electrode which is mounted on one of the side wall portions of the booth and shaped for concentrating an electrostatic field extending between said electrode and an article to be coated.

5. An installation, according to claim 1 or claim 2, in which the second electrostatic means comprise at least one length of wire mounted on one side wall portion of the booth.

6. An installation, according to claim 1, in which the first electrostatic means are connected to first electrostatic generator means.

7. An installation, according to claim 6, in which the second electrostatic means are connected to second electrostatic generator means.

8. An installation, according to claim 1, claim 2, claim 6 or claim 7, in which at least the roof portion and the side wall portions are internally lined with insulating material.

* * * * *